US008698960B2

(12) United States Patent
Chen

(10) Patent No.: US 8,698,960 B2
(45) Date of Patent: Apr. 15, 2014

(54) DECODER AND METHOD FOR SEPARATING LUMINANCE AND CHROMINANCE INFORMATION FROM A COMPOSITE VIDEO SIGNAL

(75) Inventor: I-Hong Chen, Taoyuan (TW)

(73) Assignee: Mediatek Inc., Hsinchu (TW)

(*) Notice: Subject to any disclaimer, the term of this patent is extended or adjusted under 35 U.S.C. 154(b) by 1371 days.

(21) Appl. No.: 12/050,254

(22) Filed: Mar. 18, 2008

(65) Prior Publication Data

US 2009/0237568 A1   Sep. 24, 2009

(51) Int. Cl.
*H04N 9/78* (2006.01)

(52) U.S. Cl.
USPC ............ 348/666; 348/663; 348/664; 348/665

(58) Field of Classification Search
USPC ......................................................... 384/666
See application file for complete search history.

(56) References Cited

U.S. PATENT DOCUMENTS

| | | | |
|---|---|---|---|
| 5,424,784 A | 6/1995 | Raby | |
| 5,561,467 A * | 10/1996 | Takeuchi et al. | 375/240.25 |
| 6,424,384 B1 | 7/2002 | Tsyrganovich | |
| 2004/0119892 A1* | 6/2004 | Ishihara | 348/663 |
| 2006/0170826 A1 | 8/2006 | Park et al. | |
| 2008/0024670 A1 | 1/2008 | Chen et al. | |

FOREIGN PATENT DOCUMENTS

CN   1812597   8/2006

OTHER PUBLICATIONS

Chinese Office Action from related Chinese Application No. 200810135053.9 dated Mar. 11, 2010.

* cited by examiner

*Primary Examiner* — Vivek Srivastava
*Assistant Examiner* — Anthony Bantamoi
(74) *Attorney, Agent, or Firm* — Grossman, Tucker, Perreault & Pfleger, PLLC

(57) ABSTRACT

A decoder and a method for separating luminance and chrominance information from a target pixel in a composite video signal are provided. The decoder comprises a delay module, a filter module, a weighting factor generator, and a separator. The delay module is configured to delay a plurality of horizontal lines of the composite video signal to output a plurality of pixels including the target pixel. The filter module is coupled to the delay module and configured to filter the composite video signal in a horizontal direction and a vertical direction to generate a plurality of frequency components. The weighting factor generator is configured to generate a first weighting factor of the target pixel according to the horizontal direction and a second weighting factor of the target pixel according to the vertical direction. The separator is configured to separate luminance information from the target pixel in accordance with the frequency components, the first weighting factor, and the second weighting factor.

18 Claims, 7 Drawing Sheets

DECODER AND METHOD FOR SEPARATING LUMINANCE AND CHROMINANCE INFORMATION FROM A COMPOSITE VIDEO SIGNAL

CROSS-REFERENCES TO RELATED APPLICATIONS

Not applicable.

BACKGROUND OF THE INVENTION

1. Field of the Invention

The present invention relates to video signal processing; more particularly, the present invention relates to decoders and methods for separating luminance and chrominance information from a composite video signal.

2. Descriptions of the Related Art

Video, a technology which is first developed for TV systems, processes a sequence of still images and represent them in motion. Video has been further developed in various formats to allow different media, such as internet or disks, for storage and distribution.

A composite video signal is composed of luminance and chrominance components, wherein luminance is a photometric measure of the density of luminous intensity and chrominance is used to represent the color information of the pictures. For example, a luminance component of a TV video signal carries the primary gray-level information and is suitable for display in a monochrome TV, and the chrominance component carries color information of the TV video signal and is mixed with the luminance component to generate an RGB signal for TV display.

More specifically, the TV video signal can be a NTSC color television signal which includes a luminance component ranging in frequency from direct current to a nominal bandwidth of 4.2 MHz, and a 3.58 MHz subcarrier which is modulated in phase and amplitude to represent hue and saturation of the image. Typically, the subcarrier is demodulated to produce color difference signals which are combined with the luminance component for reproduction of red, blue, and green color information. As is well known, simple filters have long been used to separate the chrominance from the luminance in television receivers. In particular, the composite video signal is typically fed to a low pass filter to extract the luminance information, and to a band pass filter to extract the chrominance information.

However, cross luminance artifacts, such as hanging dots and sot crawls, usually appear after separating chrominance and luminance from the composite video signal because of the cross luminance and cross chrominance (cross color). In summary, because video display quality is important to viewers, a method of luminance and chrominance separation without producing cross luminance artifacts is desirable.

SUMMARY OF THE INVENTION

The primary objective of this invention is to provide decoders and methods for separating luminance and chrominance information of a target pixel in a composite video signal. An embodiment of the decoders comprises a delay module, a filter module, a weighting factor generator, and a separator. The delay module is configured to delay a plurality of horizontal lines in the composite video signal to output a plurality of pixels including the target pixel. The filter module is coupled to the delay module and configured to filter the composite video signal in a horizontal direction and a vertical direction to generate a plurality of frequency components. The weighting factor generator is configured to generate a first weighting factor of the target pixel according to the horizontal direction and a second weighting factor of the target pixel according to the vertical direction. The separator is configured to separate luminance information from the target pixel in accordance with the frequency components, the first weighting factor, and the second weighting factor.

An exemplary embodiment of the methods comprises the following steps: filtering a composite video signal with a plurality of horizontal lines composed of a plurality of pixels in a vertical direction and a horizontal direction to generate a plurality of frequency components; generating a first weighting factor of a target pixel according to the horizontal direction; generating a second weighting factor of the target pixel according to the vertical direction; and generating a first separated information of the target pixel in accordance with the frequency components, the first weighting factor, and the second weighting factor.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
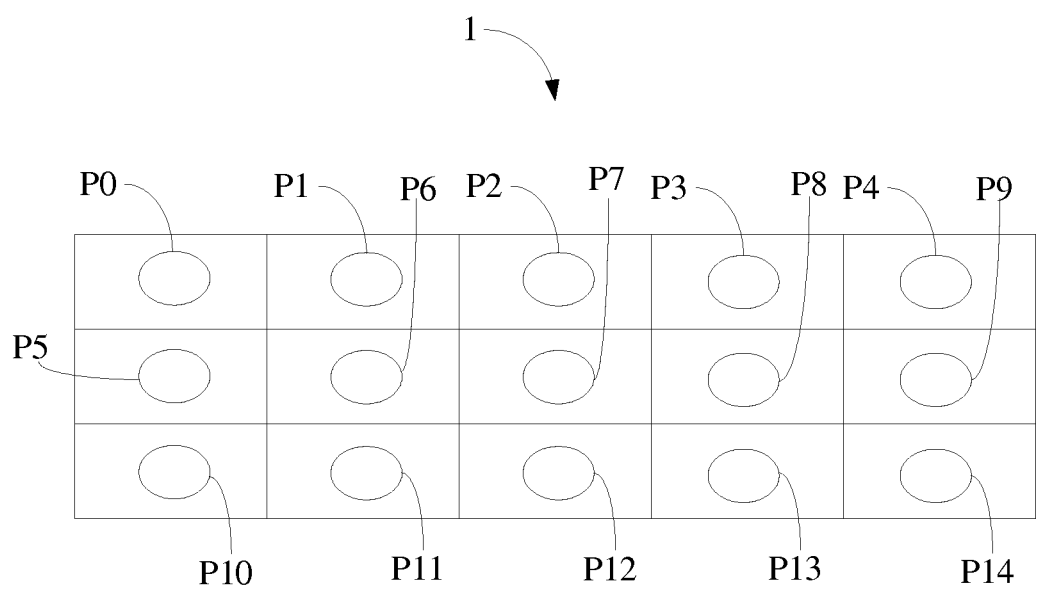
FIG. 1 is a schematic diagram of a filter mask.

A video signal composed of a plurality of pictures, and a picture is composed of a plurality of pixels, separating luminance and chrominance information of a video signal is realized by separating the luminance and chrominance information from each of the pixels. In general, a filter processes a target pixel of a sampled composite video signal by first acquiring target pixel and pixels surrounding the target pixel. For example, as shown in FIG. 1, a target pixel P7 and its surrounding pixels P0 to P14 are acquired by line delay units and pixel delay units. The number of pixels acquired by the filter for separating chrominance and luminance of a target pixel is not necessary to be 15 as shown in FIG. 1 as it can be varied according to the filter design.

Figure 2:
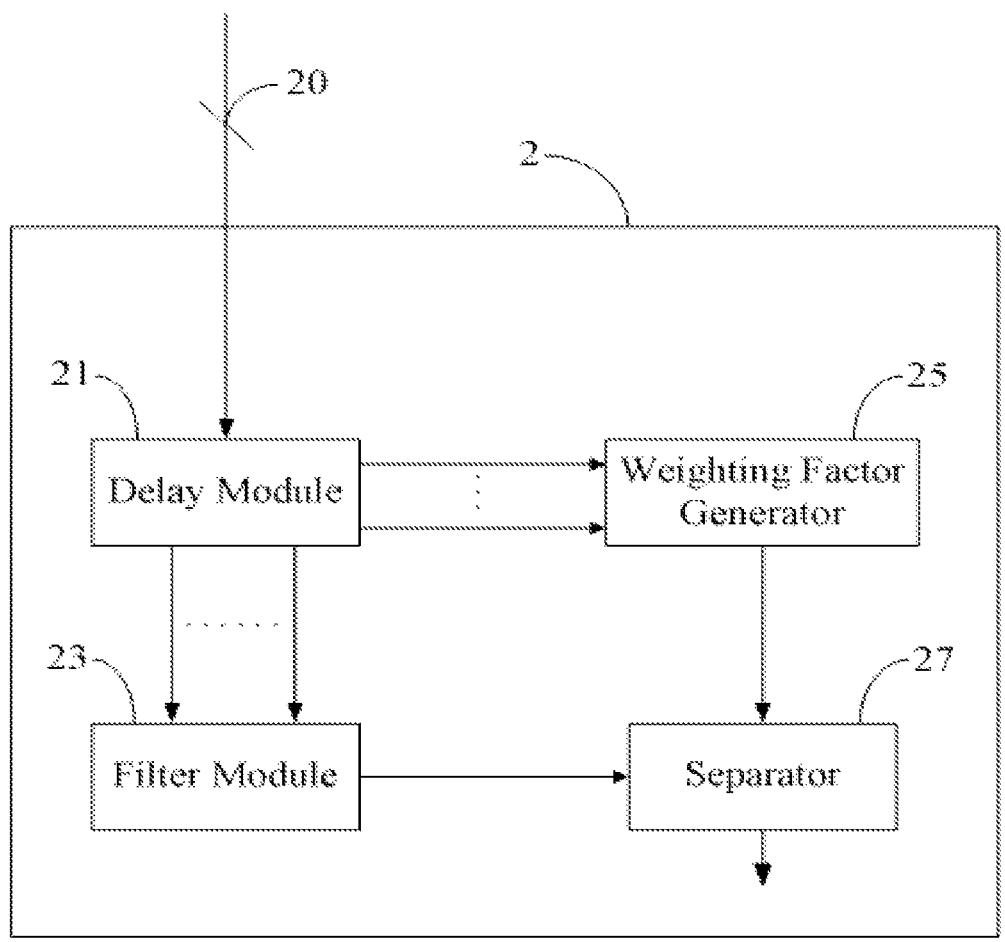
FIG. 2 is a schematic diagram of an exemplary decoder of the invention.
Figure 3:
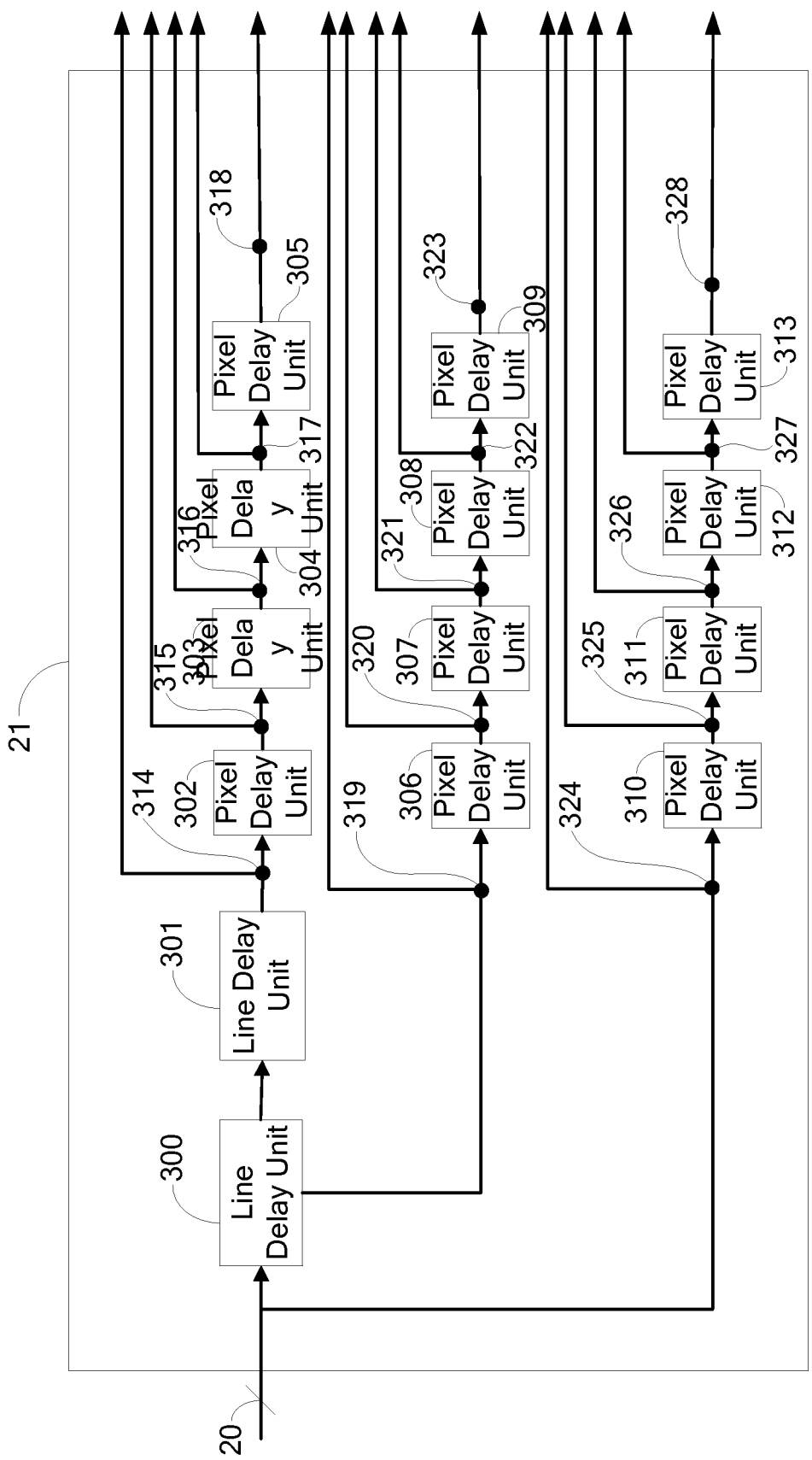
FIG. 3 is a schematic diagram of an exemplary delay module of the decoder of FIG. 2.

FIG. 2 illustrates an embodiment of a decoder 2 of the present invention. The decoder 2 comprises a delay module 21, a filter module 23, a weighting factor generator 25, and a separator 27. The decoder 2 receives a composite video signal 20 and the delay module 21 comprises a plurality of line delay units and a plurality of pixel delay units (not shown), and is configured to output a plurality of horizontal lines composed of a target pixel and a plurality of neighboring pixels. FIG. 3 shows an example of the delay module 21, which comprises line delay units 300 and 301, and pixel delay units 302 to 313. In this embodiment, three horizontal lines each comprising a plurality of pixels are retrieved for calculation. Pixels of a first horizontal line are retrieved through two line delay units 300 and 301 and respectively through pixel delays 302 to 305, pixels of a second horizontal line are retrieved through one line delay 300 and respectively through pixel delays 306 to 309, and pixels of a third horizontal line are respectively retrieved before pixel delay 310 and after pixel delays 310 to 313.

In the hardware, pixels of the picture are inputted into the delay module 21 one by one. To hold 15 sampled pixels for conducting luminance and chrominance separation for a target pixel (e.g. pixel 321), the delay module 21 uses two line delay units 300 and 301, and twelve pixel delay units 302 to 313. These 15 pixels 314 to 328 as shown in FIG. 3 are provided to a processing unit, such as the filter module 23 as shown in FIG. 2. It is noted that the number of line and pixel delays may depend on the processing ability of the processing unit, it is however not a limitation of the present invention.

Figure 4A:
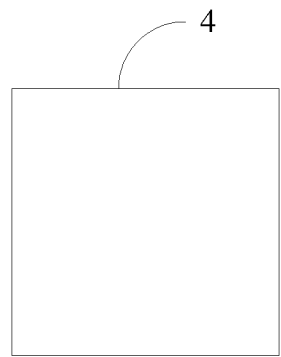
FIG. 4A is a schematic diagram of the frequency domain of an unfiltered picture.

The filter module 23 coupled to the delay module 21 filters the composite video signal in a horizontal direction and a vertical direction to generate a plurality of frequency components. FIGS. 4A-4D show a series of schematic diagrams illustrating an exemplary process of filtering the composite video signal. FIG. 4A illustrates a two-dimensional frequency domain of an unfiltered composite video signal, where the vertical and horizontal axes respectively represent the vertical and horizontal frequency.

Figure 4B:
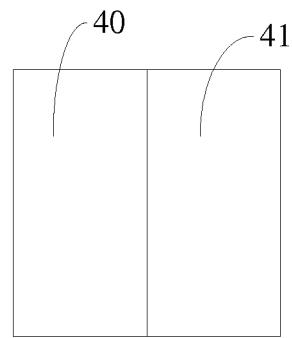
FIG. 4B is a schematic diagram of the frequency domain of the picture filtered in the horizontal direction.

As shown in FIG. 4B, the filtering module 23 first filters the composite video signal 20 in the horizontal direction to generate a low horizontal frequency component 40 and a high horizontal frequency component 41.

Figure 4C:
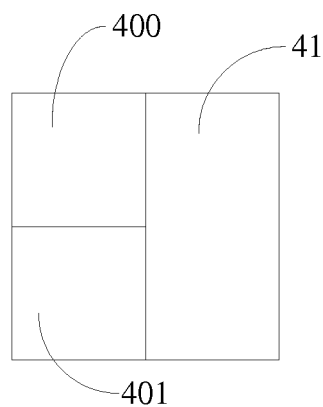
FIG. 4C is a schematic diagram of the frequency domain of the low horizontal frequency component filtered in the vertical direction.

As shown in FIG. 4C, the filtering module 23 filters the low horizontal frequency component 40 in the vertical direction to generate a first frequency component 400 with high vertical frequency and a second frequency component 401 with low vertical frequency.

Figure 4D:
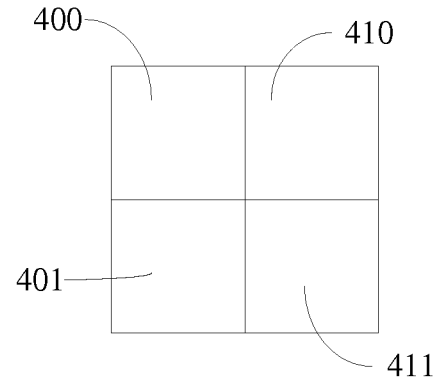
FIG. 4D is a schematic diagram of the frequency domain of the high horizontal frequency component filtered in the vertical direction.

Finally, as shown in FIG. 4D, the filtering module 23 filters the high horizontal frequency component 41 in the vertical direction to generate a third frequency component 410 with high vertical frequency and a fourth frequency component 411 with low vertical frequency.

More specifically, the filter module 23 filters the composite video signal 20 in the horizontal direction to generate a low horizontal frequency component 40 corresponding to the target pixel 321 ($P_{321}$). The following equations show an example of conducting horizontal filtering for the composite video signal $$A_1=(P_{314}+P_{315}*0+P_{316}*2+P_{317}*0+P_{318})/4$$

$$A_2=(P_{319}+P_{320}*0+P_{321}*2+P_{322}*0+P_{323})/4$$

$$A_3=(P_{324}+P_{325}*0+P_{326}*2+P_{327}*0+P_{328})/4,$$

wherein $P_{314}$ to $P_{328}$ represent composite information including luminance information and chrominance information of the pixels 314 to 328 respectively, and $A_1$ to $A_3$ respectively represent upper, medium, and lower lines in the low horizontal frequency component 40.

The filter module 23 may also generate a high horizontal frequency component 41 corresponding to the target pixel 321 based on the low horizontal frequency component 40.

$$B_1=P_{316}-A_1$$

$$B_2=P_{321}-A_2$$

$$B_3=P_{326}-A_3,$$

wherein $B_1$ to $B_3$ respectively represent upper, medium, and lower lines in the high horizontal frequency component 41.

The first frequency component 400 and second frequency component 401 are generated by vertical filtering the low horizontal frequency component 40, and the following equations show an example of conducting vertical filtering on the low horizontal frequency component 40.

$$D=(A_1+A_2*2+A_3)/4$$

$$C=A_2-D,$$

wherein D and C represent the second frequency component 401 and first frequency component 400, respectively.

Similarly, the low horizontal frequency component 41 is further divided into the third frequency component 410 and fourth frequency component 411.

$$F=(B_1+B_2*2+B_3)/4$$

$$E=B_2-F,$$

wherein F and E represent the fourth frequency component 411 and third frequency component 410, respectively. In summary, the second frequency component 401 is filtered to contain low frequency components at both vertical and horizontal directions, the third frequency component 410 is filtered to contain high frequency components at both vertical and horizontal directions, the first frequency components 400 contains high vertical frequency and low horizontal frequency components, and the fourth frequency component 411 contains high horizontal frequency but low vertical frequency components. To separate luminance information, the second frequency component 401 and weighted first and fourth frequency components 400 and 411 are reserved, and the third frequency component 410 is removed in this embodiment.

Figure 5:
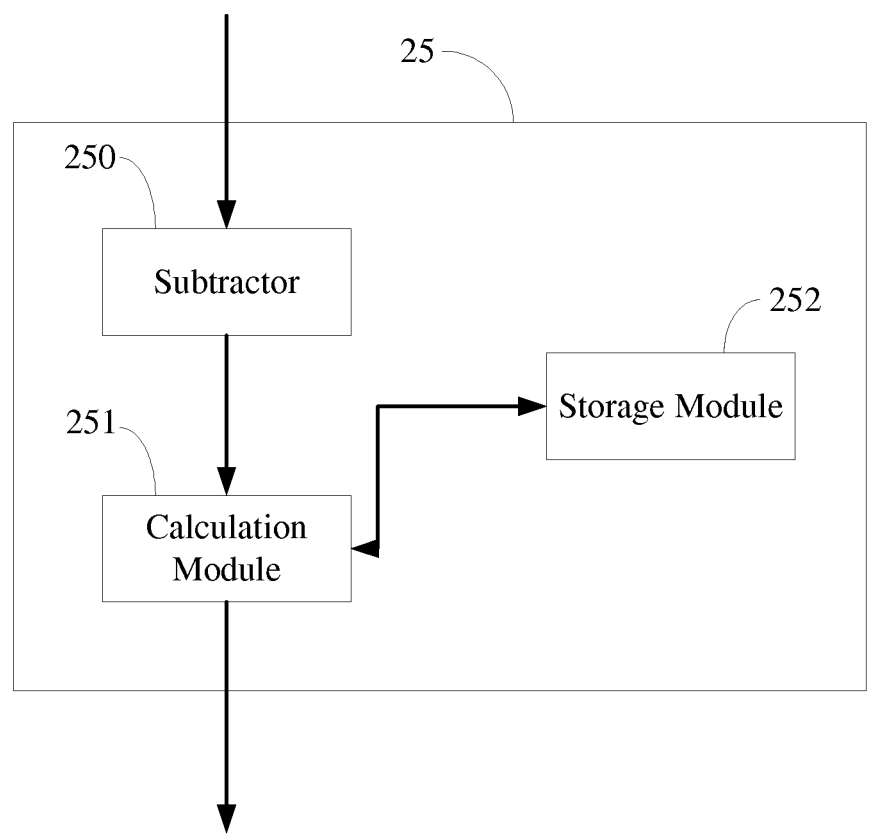
FIG. 5 is a schematic diagram of an exemplary weighting factor generator of the decoder of FIG. 2.

The weighting factor generator 25 of this embodiment is configured to generate a first weighting factor of the target pixel 321 according to the horizontal direction. FIG. 5 shows a weighting factor generator 25 comprising a subtractor 250, a calculation module 251, and a storage module 252. The storage module 252 is configured to store a lookup table (not shown) comprising a plurality of predetermined weighting factors. The subtractor 250 is configured to subtract two pixels (i.e. pixels 319 and 323) which are arranged in the same horizontal line with the target pixel 321. The calculation module 251 is configured to generate a first absolute value of the subtracted result. The first weighting factor is retrieved in accordance with the first absolute value from the lookup table stored in the storage module 252.

In addition, the weighting factor generator 25 can be further configured to generate a second weighting factor of the target pixel 321 according to the vertical direction. The subtractor 250 is further configured to subtract an upper pixel (i.e. pixels 316) of the target pixel 321 from a lower pixel (i.e. pixels 326) of the target pixel 321. The calculation module 251 is further configured to generate a second absolute value of the subtracted result of the two pixels. The second weighting factor is retrieved in accordance with the second absolute value from another lookup table stored in the storage module 252. In some other embodiments, the weighting factor generator 25 is realized by two sets of weighting factor generator comprising a subtractor, a calculation module, and a look up table, where one set of weighting factor generator generates the first weighting factor for the first frequency component 400 and the other generates the second weighting factor for the fourth frequency component 411.

The separator 27 is configured to separate luminance information from the target pixel 321 in accordance with the frequency components, the first weighting factor, and the second weighting factor. More particularly, the separator 27 retrieves the luminance information according to the following equation:

$$L=D+Kc*C+Kf*F+0*E,$$

wherein L is the luminance information, Kc is the first weighting factor, and Kf is the second weighting factor.

The separator 27 is configured to separate chrominance information from the target pixel 321 according to the luminance information of the target pixel 321 and the target pixel 321. In fact, the chrominance information of the target pixel 321 is separated by subtracting the luminance information of the target pixel 321 from the composite information of target pixel 321, which can be represented as the following equation:

$$C=P_{321}-L,$$

wherein C is the chrominance information.

Figure 6:
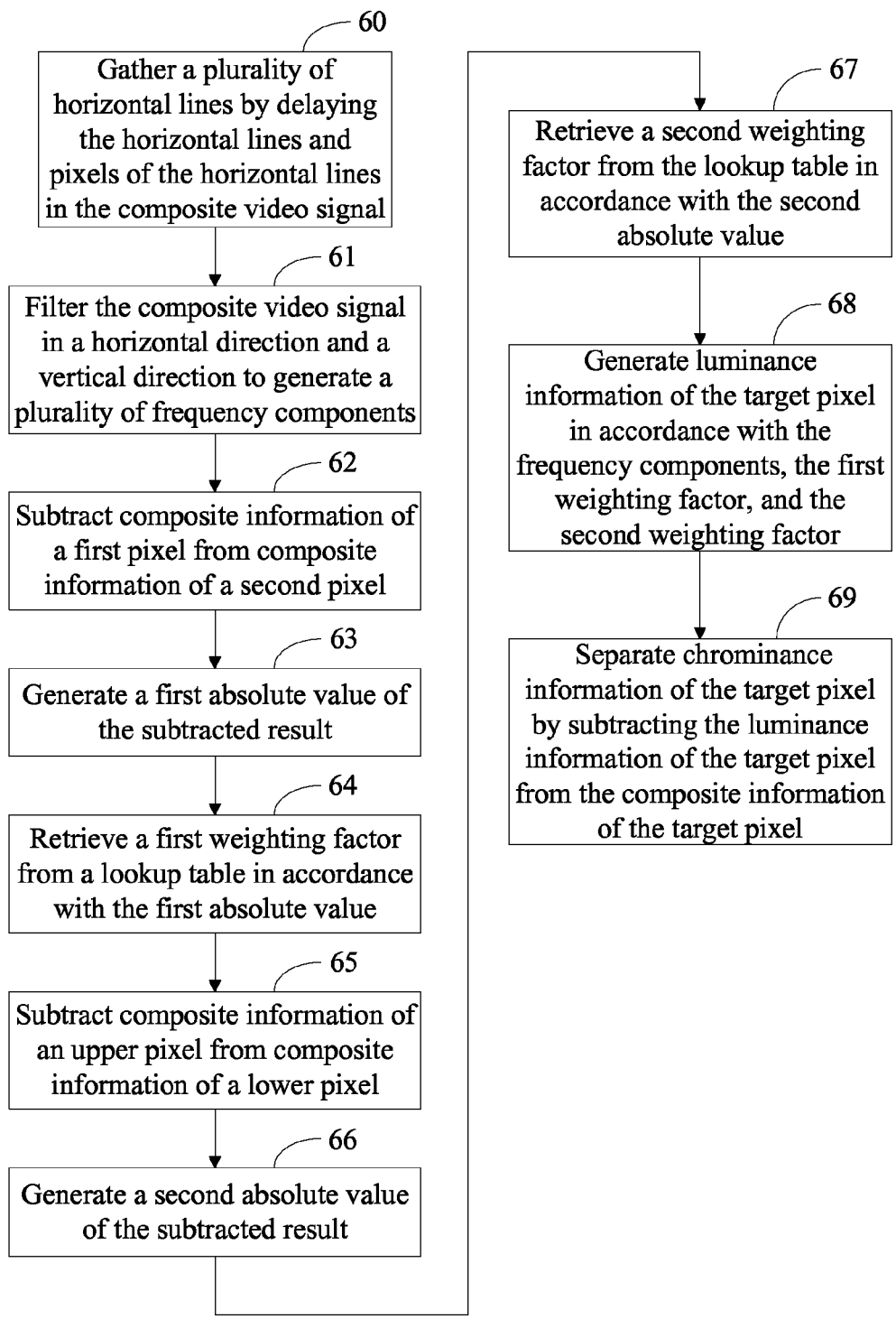
FIG. 6 is a flow chart of an exemplary method of the invention.

FIG. 6 is a flow chart illustrating an embodiment of a method, for separating luminance and chrominance information from a composite video signal. More specifically, the method illustrated in FIG. 6 can be implemented by various modules of the decoder 2. Step 60 is executed to delay a plurality of horizontal lines in the composite video signal to obtain a plurality of pixels. Step 61 is executed to filter the composite video signal in a horizontal direction and a vertical direction to generate a plurality of frequency components.

Step 62 is executed to subtract composite information of a first pixel from composite information of a second pixel, the first and second pixels are arranged in the same horizontal line with the target pixel. Step 63 is executed to generate a first absolute value of the subtracted result of Step 62. Step 64 is executed to retrieve a first weighting factor from a lookup table in accordance with the first absolute value. Step 65 is executed to subtract composite information of an upper pixel from composite information of a lower pixel, the upper and lower pixels are arranged in the same vertical line with the target pixel. Step 66 is executed to generate a second absolute value of the subtracted result of Step 65. Step 67 is executed to retrieve a second weighting factor from a lookup table in accordance with the second absolute value. Specifically, the first and second weighting factors are between 0 and 1, and more specifically, a greater first absolute value typically results in a smaller first weighting factor, and a greater second absolute value typically results in a smaller second weighting factor.

After the first and the second weighting factors are generated, step 68 is executed to separate luminance information of the target pixel in accordance with the frequency components, the first weighting factor, and the second weighting factor. Finally, step 69 is executed to separate chrominance information of the target pixel by subtracting the luminance information of the target pixel from the composite information of the target pixel.

Figure 7:
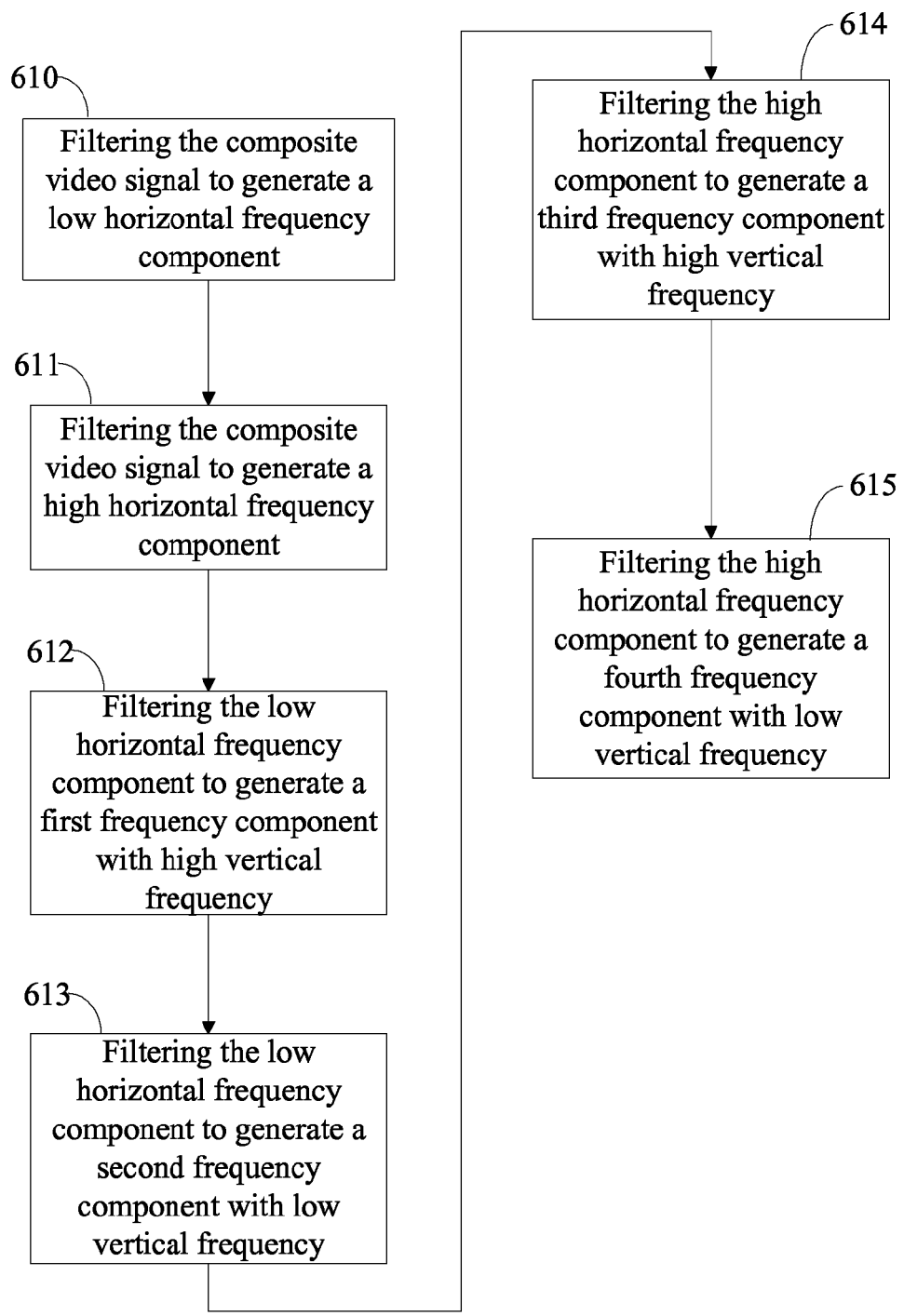
FIG. 7 is a flow chart illustrating details of generating a plurality of frequency components of the method of the invention.

FIG. 7 illustrates the details of generating a plurality of frequency components as stated in Step 61 of FIG. 6. Step 610 is executed to filter the composite video signal to generate a low horizontal frequency component. Likewise, step 611 is executed to filter the composite video signal to generate a high horizontal frequency component. Step 612 is executed to filter the low horizontal frequency component to generate a first frequency component with a high vertical frequency. Likewise, step 613 is executed to filter the low horizontal frequency component to generate a second frequency component with a low vertical frequency. Then, step 614 is executed to filter the high horizontal frequency component to generate a third frequency component with a high vertical frequency. Finally, step 615 is executed to filter the high horizontal frequency component to generate a fourth frequency component with a low vertical frequency. An embodiment of filtering the composite video signal to generate the four frequency components is described in the above content and thus omitted for brevity.

According to the aforementioned descriptions, the luminance and chrominance information is separated from a target pixel in a composite video signal through summing the frequency components with some weighting factors. The weighting factors are mainly used to decide the importance of the frequency components and to prevent cross luminance artifacts such as hanging dot and dot crawls.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A decoder capable of separating luminance and chrominance information from a target pixel in a composite video signal, comprising:
   a delay module delaying a plurality of horizontal lines of the composite video signal for outputting a plurality of pixels including the target pixel;
   a filter module coupled to the delay module, for filtering the composite video signal in a horizontal direction and a vertical direction to generate a plurality of frequency components; a weighting factor generator for generating a first weighting factor of the target pixel according to the horizontal direction and a second weighting factor of the target pixel according to the vertical direction; and
   a separator for separating a first separated information from the target pixel in accordance with the frequency components, the first weighting factor, and the second weighting factor;
      wherein the first weighting factor and the second weighting factor are used as coefficients in a formula for calculating the first separated information.

2. The decoder of claim 1, wherein the delay module comprises a line delay and a plurality of pixel delays, for delaying a horizontal line and a plurality of pixels respectively.

3. The decoder of claim 1, wherein the filtering module filters the composite video signal in a horizontal direction to generate a low horizontal frequency component and a high horizontal frequency component, filters the low horizontal frequency component to generate a first frequency component with high vertical frequency and a second frequency component with low vertical frequency, and filters the high horizontal frequency component to generate a third frequency component with high vertical frequency and a fourth frequency component with low vertical frequency.

4. The decoder of claim 1, wherein the separator separates a second separated information from the target pixel according to the first separated information of the target pixel and composite information of the target pixel.

5. The decoder of claim 4, wherein the first separated information is the luminance information and the second separated information is the chrominance information.

6. The decoder of claim 4, wherein the second separated information of the target pixel is separated by subtracting the first separated information of the target pixel from the composite information of the target pixel.

7. The decoder of claim 1, wherein the weighting factor generator comprises:
   a subtractor for subtracting a first pixel from a second pixel, wherein the first and second pixels are arranged in the same horizontal line with the target pixel;
   a calculation module for generating a first absolute value of the subtracted result of the first and second pixels arranged in the same horizontal line with the target pixel; and
   a storage module for storing a lookup table;
      wherein the first weighting factor is retrieved in accordance with the first absolute value and the lookup table.

8. The decoder of claim 1, wherein the weighting factor generator comprises:
   a subtractor for subtracting an upper pixel and a lower pixel of the target pixel;
   a calculation module for generating a second absolute value of the subtracted result of the upper and lower pixels; and
   a storage module for storing a lookup table;
      wherein the second weighting factor is retrieved in accordance with the second absolute value and the lookup table.

9. A method for separating luminance and chrominance information from a target pixel in a composite video signal, the method comprising the steps of:
   delaying a plurality of horizontal lines of the composite video signal to gather a plurality of pixels including the target pixel;
   filtering the composite video signal in a horizontal direction and a vertical direction to generate a plurality of frequency components;
   generating a first weighting factor of the target pixel according to the horizontal direction;
   generating a second weighting factor of the target pixel according to the vertical direction; and
   generating a first separated information of the target pixel in accordance with the frequency components, the first weighting factor, and the second weighting factor;
      wherein the first weighting factor and the second weighting factor are used as coefficients in a formula for calculating the first separated information.

10. The method of claim 9, wherein the step of delaying a plurality of horizontal lines further comprises using line delays to delay the horizontal lines and using pixel delays to delay the pixels of the horizontal lines.

11. The method of claim 9, wherein the step of filtering the composite video signal further comprises the steps of:
   filtering the composite video signal to generate a low horizontal frequency component and a high horizontal frequency component;
   filtering the low horizontal frequency component to generate a first frequency component with high vertical frequency and a second frequency component with low vertical frequency; and
   filtering the high horizontal frequency component to generate a third frequency component with high vertical frequency and a fourth frequency component with low vertical frequency.

12. The method of claim 9, further comprising the step of separating a second separated information from the target pixel according to the first separated information of the target pixel and composite information of the target pixel.

13. The method of claim 12, wherein the first separated information is the luminance information and the second separated information is the chrominance information.

14. The method of claim 12, wherein the step of generating the second separated information of the target pixel further comprises the step of subtracting the first separated information of the target pixel from the composite information of the target pixel to retrieve the second separated information of the target pixel.

15. The method of claim 9, wherein the step of generating the first weighting factor further comprises the steps of:
   subtracting a first pixel from a second pixel, wherein the first and second pixels are arranged in the same horizontal line with the target pixel;
   generating a first absolute value of the subtracted result; and
   retrieving the first weighting factor by searching a lookup table in accordance with the first absolute value.

16. The method of claim 9, wherein the step of generating the second weighting factor further comprises the steps of:
   subtracting an upper pixel and a lower pixel of the target pixel;
   generating a second absolute value of the subtracted result; and
   retrieving the second weighting factor by searching a lookup table in accordance with the second absolute value.

17. A decoder capable of separating luminance and chrominance information from a target pixel in a composite video signal, comprising:
   a delay module delaying a plurality of horizontal lines of the composite video signal for outputting a plurality of pixels including the target pixel;
   a filter module coupled to the delay module, for filtering the composite video signal in a horizontal direction and a vertical direction to generate a plurality of frequency components;
   a weighting factor generator for generating a first weighting factor of the target pixel according to the horizontal direction and a second weighting factor of the target pixel according to the vertical direction; and
   a separator for separating a first separated information from the target pixel in accordance with the frequency components, the first weighting factor, and the second weighting factor;
      wherein the plurality of frequency components are composite video signals.

18. The decoder of claim 17, wherein the filtering module filters the composite video signal in a horizontal direction to generate a low horizontal frequency component and a high horizontal frequency component, filters the low horizontal frequency component to generate a first frequency component with high vertical frequency and a second frequency component with low vertical frequency, and filters the high horizontal frequency component to generate a third frequency component with high vertical frequency and a fourth frequency component with low vertical frequency.

\* \* \* \* \*